(No Model.)

T. J. MAYALL.
Making Rubber Tubing and Machinery Therefor.
No. 241,231. Patented May 10, 1881.

Witnesses.

Inventor.

UNITED STATES PATENT OFFICE.

THOMAS J. MAYALL, OF READING, MASSACHUSETTS.

MAKING RUBBER TUBING AND MACHINERY THEREFOR.

SPECIFICATION forming part of Letters Patent No. 241,231, dated May 10, 1881.

Application filed March 24, 1881. (No model.)

*To all whom it may concern:*

Be it known that I, THOMAS J. MAYALL, of Reading, in the county of Middlesex and Commonwealth of Massachusetts, have invented a new and useful improvement in the method or process of making tubing of india-rubber ground and mixed with the proper chemical substances for vulcanizing, and machinery for working the process, of which the following is a specification.

The method or process and the machinery for working it are so intimately connected that both must be described together.

Figure 1:
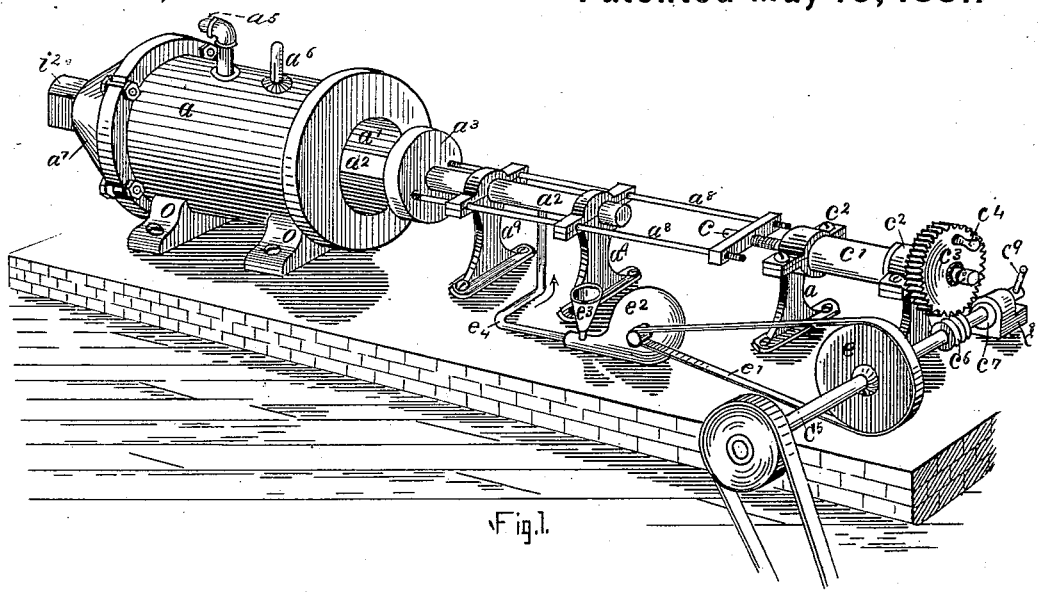
Figure 2:
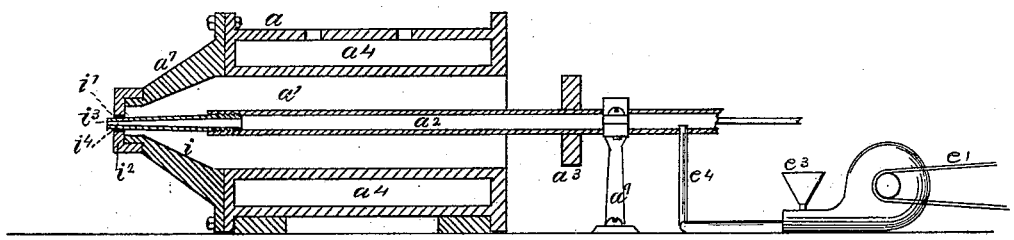
Figure 3:
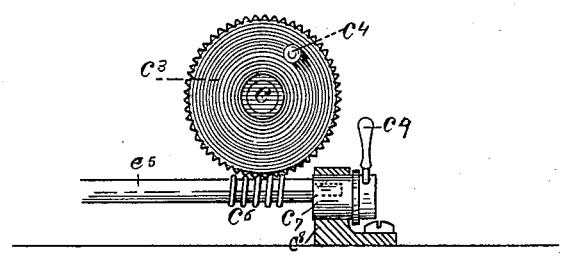

In the drawings annexed, Figure 1 shows a perspective of the machine and its several parts. Fig. 2 shows a longitudinal sectional view of a jacketed cylinder and the connected parts. Fig. 3 shows a detail of a portion of the driving-gear by which the machine is actuated.

The same letters indicate the same parts in each of the different figures.

$a$ is a double or jacketed cylinder, of cast-iron or other suitable metal, having cylindrical chamber within the inner plate, which is marked $a'$.

$a^2$ is a hollow shaft extending the whole length of the chamber $a'$ and through and resting in the supports at the rear of the chamber marked $a^9$ $a^9$.

Firmly fixed on the hollow shaft $a^2$ is a follower marked $a^3$, the diameter of which is such that it will just go into and closely fit the inner bore of the chamber $a'$.

$a^4$ is the space between the outer and inner shells of the cylinder $a$.

$a^5$ is a conducting-pipe for the introduction of steam between the outer and inner shells of the chamber $a$.

$a^6$ is an opening in the outer shell of the cylinder $a$, through which the bulb of a thermometer may be introduced, and which may be closed by any suitable means around the tube of the thermometer, leaving the graduated tube and scale outside for observation.

$a^7$ is a funnel-shaped head on the forward end of the cylinder $a$.

$a^8$ $a^8$ are metal rods or shafts of a size to have sufficient strength to force the follower $a^3$ into the chamber $a'$, and extend rearward from the follower $a^3$ by the supports $a^9$ $a^9$ to and connect with a yoke on the screw marked $c$.

$c$ is a male screw running into the female screw marked $c'$, and has a yoke or cross-head on its forward end, to which the shafts $a^8$ $a^8$ are connected.

$c'$ is a hollow shaft with a screw-thread inside, into which the thread of the screw $c$ works and revolves in the bearings $c^2$ $c^2$.

$c^3$ is a gear-wheel on the rear end of the hollow shaft $c'$.

$c^4$ is a handle or crank-pin on the gear-wheel $c^3$.

$c^5$ is a driving-shaft at right angles to the hollow shaft $c'$, and carries a worm-gear on it, (marked $c^6$,) which works into the teeth of the gear-wheel $c^3$.

$c^7$ is a cam on the driving-shaft $c^5$, working in a socket in the supporting-block marked $c^8$, which, moved forward by the lever marked $c^9$, throws the worm-gear $c^6$ into the teeth of the gear-wheel $c^3$, so that the revolution of the shaft $c^5$ will revolve the gear-wheel $c^3$ and the hollow shaft $c'$, and a reverse motion of the lever $c^9$ throws the worm $c^6$ out of the teeth of the gear-wheel $c^3$, the motion of which then ceases.

$e$ is a pulley on the shaft $c^5$, with a belt marked $e'$ running over it, and a small pulley on the shaft of the fan-blower, (marked $e^2$.)

On the nozzle or outlet of the fan-blower $e^2$ is placed a funnel-shaped receptacle for pulverized French chalk or other similar substance, which is marked $e^3$, from the bottom of which there is a passage opening into the nozzle of the fan-blower $e^2$.

From the nozzle of the fan-blower a pipe marked $e^4$ extends to and into the hollow of the shaft $a^2$.

$i$ is the cone-shaped chamber in the head $a^7$.

$i'$ is a hollow mandrel, upon which the rubber tube is to be formed, which is screwed into the forward end of the hollow shaft $a^2$, and extends forward and through the opening in the forward end of the cone-shaped head $a^7$ and the cap $i^2$.

$i^2$ is a cap which goes onto the forward end of the cone-shaped head $a^7$, with a hole in the center, the diameter of which forms the outside diameter of the rubber pipe, while the hollow mandrel $i$ fixes the inside diameter of the rubber tube, and the concentric space between the hollow mandrel $i$ and the hole in the cap $i^2$, which is marked $i^4$, determines the thickness of the rubber forming the pipe.

The operation of the machine and the process of making india-rubber pipe with it are as follows: The chamber $a'$ is filled with rubber ground and mixed with the proper chemical and other substances for giving it consistency and strength, and for vulcanizing, and the follower $a^3$ closed into the rear of the chamber. The box $e^3$ is filled with pulverized talc, French chalk, or other equivalent substance. Steam is introduced into the space between the walls of the cylinder $a$ until the whole mass of rubber and other substances incorporated with the rubber is in a plastic state. Motion is then given to the machine through the shaft $c^5$. The worm $c^6$, being thrown into the teeth of the gear-wheel $c^3$, revolves it and the hollow shaft $c'$, the screw-thread on the inside of which, working on the screw $c$, throws it and the cross-head or yoke on its outer end and the shafts $a^8$ $a^8$ and the follower $a^3$ slowly forward, forcing the plastic rubber in the chamber $a'$ out through the cone-shaped head $i$ and the annular space between the cap $i^2$ and the hollow mandrel $i'$, whence it slowly issues a perfectly-formed rubber pipe. The fan-blower $e^2$, being in motion by the belt $e'$, forces a current of air forward through the pipe $e^4$ into and through the hollow shaft $a^2$ and the mandrel $i$ into the inside of the rubber tube which is being ejected through the annular opening $i^4$, carrying a portion of the pulverized substance from the receptacle $e^3$ into the inside of the rubber pipe as it passes from the machine. The inside of the rubber pipe being sticky, the pulverized substance adheres to it and forms a coating on it, which prevents the rubber from sticking together inside when collapsed by handling or otherwise.

The pipe issuing from the machine is cut off in suitable or desirable lengths, and then vulcanized in the usual or by any suitable means, when it is ready for use.

Having thus described my invention and the method of practicing it, I claim as new—

1. The combination of a jacketed cylinder, a hollow core or mandrel, a follower, and a fan-blower and tube connected with said core or mandrel, substantially as described.

2. The combination, with the hollow core or mandrel, of devices, as indicated, for forcing a pulverulent preparation, such as chalk, through said core or mandrel into the interior of the pipe or tubing, as and for the purpose set forth.

3. The process of making india-rubber tubing, consisting of preparing the rubber by grinding and mixing with proper chemical and other materials for vulcanizing, warming the mass until it is in a plastic state, forcing it by pressure from a chamber through an annular opening, and coating the inside of the pipe as it passes from the chamber with pulverized substance, substantially as described.

THOS. J. MAYALL.

Witnesses:
CHS. HOUGHTON,
F. L. HOUGHTON.